(12) United States Patent
Lymberopoulos et al.

(10) Patent No.: US 9,223,955 B2
(45) Date of Patent: Dec. 29, 2015

(54) USER-AUTHENTICATION GESTURES

(71) Applicant: Microsoft Corporation, Redmond, WA (US)

(72) Inventors: Dimitrios Lymberopoulos, Redmond, WA (US); Jie Liu, Medina, WA (US); He Wang, Urbana, IL (US)

(*) Notice: Subject to any disclaimer, the term of this patent is extended or adjusted under 35 U.S.C. 154(b) by 0 days.

(21) Appl. No.: 14/168,707

(22) Filed: Jan. 30, 2014

(65) Prior Publication Data

US 2015/0213244 A1 Jul. 30, 2015

(51) Int. Cl.
| | |
|---|---|
| *G06F 21/00* | (2013.01) |
| *G06F 21/32* | (2013.01) |
| *G06F 21/31* | (2013.01) |
| *G06F 21/45* | (2013.01) |
| *G06F 3/0488* | (2013.01) |
| *G06F 3/01* | (2006.01) |
| *G06K 9/00* | (2006.01) |

(52) U.S. Cl.
CPC .............. *G06F 21/32* (2013.01); *G06F 3/017* (2013.01); *G06F 3/0488* (2013.01); *G06F 21/31* (2013.01); *G06F 21/45* (2013.01); *G06K 9/00892* (2013.01)

(58) Field of Classification Search
USPC .......................... 726/18.19; 455/411; 713/186
See application file for complete search history.

(56) References Cited

U.S. PATENT DOCUMENTS

| | | |
|---|---|---|
| 8,380,995 B1 | 2/2013 | Paul |
| 2009/0085877 A1 | 4/2009 | Chang et al. |
| 2009/0298650 A1 | 12/2009 | Kutliroff |
| 2010/0225443 A1* | 9/2010 | Bayram et al. ............... 340/5.83 |
| 2012/0124662 A1 | 5/2012 | Baca et al. |
| 2012/0164978 A1* | 6/2012 | Conti et al. .................. 455/411 |
| 2012/0174213 A1 | 7/2012 | Geiger et al. |
| 2013/0094719 A1 | 4/2013 | Haddad |
| 2013/0145457 A1 | 6/2013 | Papakipos et al. |
| 2013/0219490 A1 | 8/2013 | Isbister et al. |
| 2014/0006954 A1* | 1/2014 | Raffa et al. .................. 715/733 |

FOREIGN PATENT DOCUMENTS

| | | |
|---|---|---|
| EP | 2166487 A2 | 3/2010 |
| EP | 2662797 A1 | 11/2013 |

OTHER PUBLICATIONS

Riva, Oriana; Qin, Chuan; Strauss, Karin; Lymberopoulos, Dimitrios; "Progressive authentication: deciding when to authenticate on mobile phones"; Microsoft Research; Aug. 8, 2012.*
Continuous Mobile Authentication using Touchscreen Gestures; Feng et al; 2012 IEEE, 6 pages.*
uWave: Accelerometer-based personalized gesture recognition and its applications; Liu et al; Science Direct, Pervasive and mobile computing, 2009; 19 pages.*

(Continued)

*Primary Examiner* — Jason Lee

(74) *Attorney, Agent, or Firm* — Steve Wight; Sandy Swain; Micky Minhas

(57) ABSTRACT

This document relates to user-authentication gestures. One example can capture multiple biometric features when a user-authentication gesture is performed as a device authentication attempt. The example can compare values of the multiple biometric features to previous values stored for the user. The example can further unlock the computing device in an instance where the values of the multiple biometric features satisfy a similarity threshold relative to the previous values.

20 Claims, 10 Drawing Sheets

(56) References Cited

OTHER PUBLICATIONS

Authentication in mobile devices through hand gesture recognition; Guerra-Casanova et al; International Journal of Information Security archive vol. 11 Issue 2, Apr. 2012 ; 19 pages.*

Guse, Dennis, "Gesture-based User Authentication on Mobile Devices using Accelerometer and Gyroscope", In Thesis for M.Sc., May 2011, 110 pages.

Sae-Bae, et al., "Biometric-Rich Gestures: A Novel Approach to Authentication on Multi-touch Devices", In Proceedings of the SIGCHI Conference on Human Factors in Computing Systems, May 5, 2012, 10 pages.

Agrawal, Anshita, "User Authentication Mechanisms on Android", In PhD Dissertation, Indian Institute of Technology, Oct. 2012, 23 pages.

Kratz, et al., "Combining Acceleration and Gyroscope Data for Motion Gesture Recognition using Classifiers with Dimensionality Constraints", In Proceedings of 18th International Conference on Intelligent User Interfaces, Mar. 19, 2013, 5 Pages.

"International Search Report & Written Opinion," Mailed May 6, 2015, From PCT Patent Application No. PCT/US2015/012553, 14 Pages.

Hinckley et al., "Sensor Synaesthesia: Touch in Motion, and Motion in Touch", In Proceedings of the SIGCHI Conference on Human Factors in Computing Systems, May 7, 2011, 10 Pages.

Demand under Article 31 and Response filed Aug. 20, 2015 to the International Search Report and Written Opinion mailed May 6, 2015 from PCT Patent Application No. PCT/US2015/012553, 23 pages.

\* cited by examiner

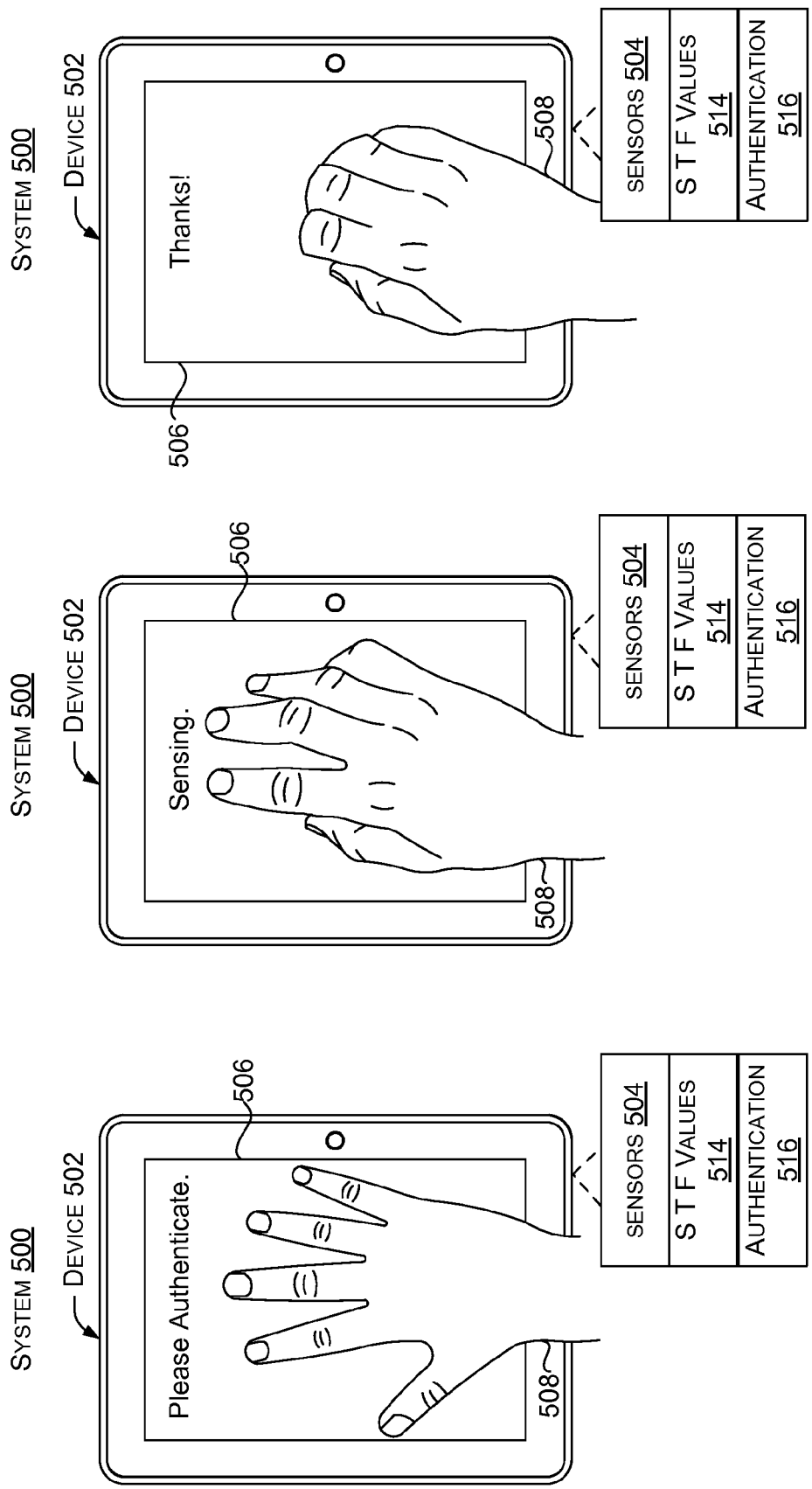

ND SERS-AUTHENTICATION GESTURES

BACKGROUND

As sensitive information, in the form of messages, photos, bank accounts, and more, finds its place on mobile devices, the need to properly secure them becomes a necessity. Traditional user-authentication mechanisms, such as lengthy passwords that include combinations of letters, numbers, and symbols, are not suited for mobile devices due to the small size of the touch screen and the lack of physical keyboards with tactile feedback. Given that users need to authenticate on their mobile devices tens or even hundreds of times throughout the day, the traditional password authentication technique becomes a real bottleneck. Further, other types of evolving devices do not lend themselves to traditional user-authentication mechanisms.

To simplify the authentication process, users tend to leave their devices completely unprotected, or they leverage simple authentication techniques such as 4-digit pins, picture passwords, or gesture unlock (e.g., trace a symbol or shape on the touchscreen). Even though these techniques allow easy and intuitive user-authentication, they compromise the security of the device, as they are susceptible to simple shoulder surface attacks. Pins, picture passwords, and unlock gestures can be easily retrieved by simply observing a user authenticating on his/her device once. In many cases, smudge fingerprints on the device's touchscreen can also be used to automatically identify the password (pin, picture, or gesture) without any direct observation of the authentication process.

Android™ devices recently brought face recognition to the masses by enabling user-authentication through the front-facing camera of the device. Even though intuitive and fast, this type of authentication suffers from typical computer vision limitations. The face recognition performance degrades significantly under poor or different lighting conditions than the ones used during training. Given that mobile devices are constantly carried and used by users, such fluctuations on the environmental conditions are common.

More recently, iPhone® introduced a touch identification technology that allows users to easily and securely unlock their devices by embedding a fingerprint sensor in the home button. Even though this approach addresses both the usability and security requirements of the authentication process, it is fundamentally limited to devices with large physical buttons on the front, such as the home button on the iPhone. However, as phone manufacturers push for devices with large edge-to edge displays, physical buttons are quickly replaced by capacitive buttons that can be easily embedded into the touchscreen, eliminating the real-estate required by a fingerprint sensor. Further, this solution requires the additional fingerprint sensor hardware and thereby increases device cost.

SUMMARY

This document relates to user-authentication gestures (or "authentication gestures"). One example can capture multiple biometric features that relate to performance of a user-authentication gesture as a device authentication attempt. The example can compare values of the multiple biometric features to previous values stored for the user. The example can further unlock the computing device in an instance where the values of the multiple biometric features satisfy a similarity threshold relative to the previous values.

Another example can include a display and at least two different types of sensors. This example can also include storage configured to store computer-readable instructions and a processing unit configured to execute the computer-readable instructions. This example can also include a user-authentication component. The user-authentication component can be configured to cause a graphical user interface to be presented on the display that instructs a user to perform a user-authentication gesture multiple times during a training session. The user-authentication component can be configured to receive sensor data from the at least two different types of sensors obtained during the training session. The user-authentication component can also be configured to generate a personalized similarity threshold for the user based upon the sensor data obtained during the training session. The user-authentication component further can be configured to receive additional sensor data when the user-authentication gesture is performed in a subsequent device authentication attempt. The user-authentication component can be configured to authenticate the use of the device in an instance where a similarity of the additional sensor data to the sensor data satisfies the personalized similarity threshold.

This Summary is provided to introduce a selection of concepts in a simplified form that are further described below in the Detailed Description. This Summary is not intended to identify key or essential aspects of the claimed subject matter, nor is it intended to be used as an aid in determining the scope of the claimed subject matter.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

FIGS. 1-18 are examples of authentication gesture scenarios and systems in accordance with some implementations of the present concepts.

DETAILED DESCRIPTION

Overview

Figure 1:
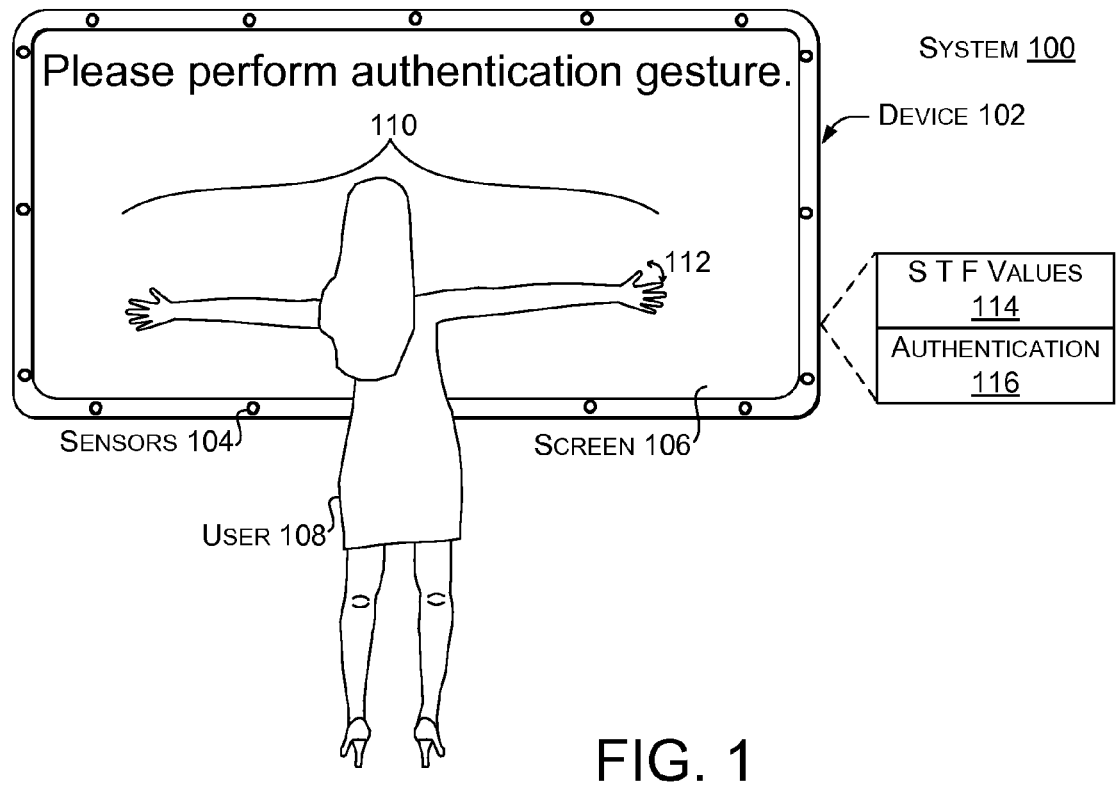
Figure 2:
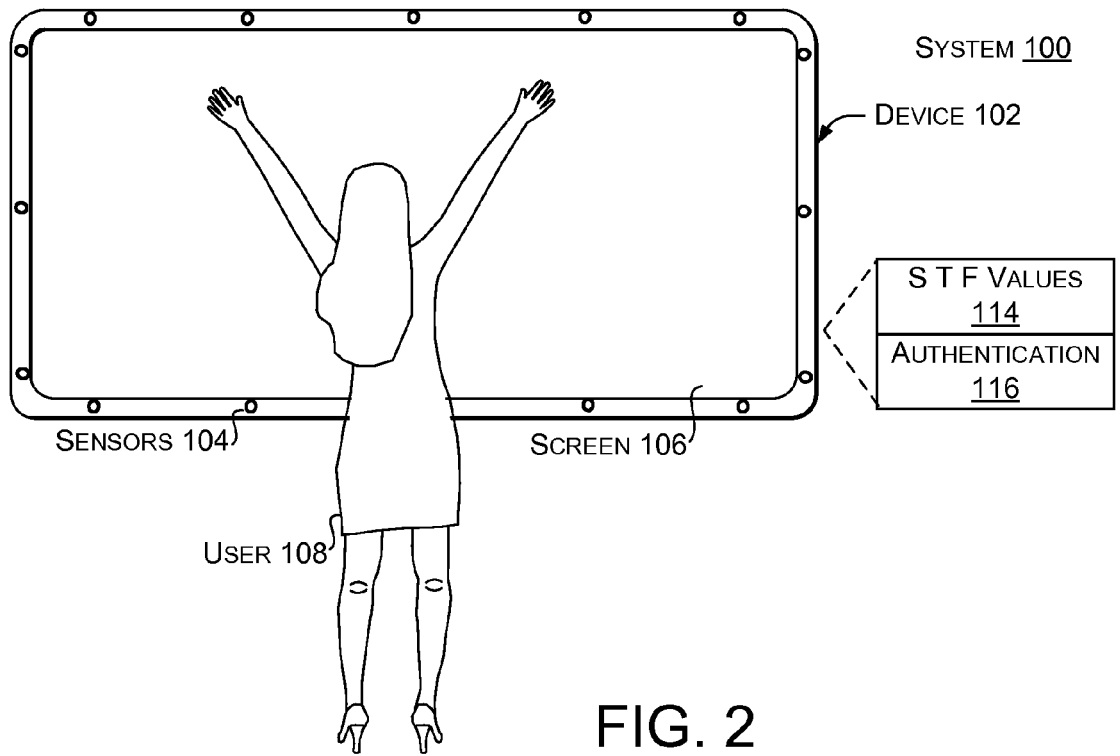

Today mobile users authenticate on their mobile devices (i.e., phones/tablets) through simple four-digit passcodes or gestures. Even though this process makes it easy for users to unlock their devices, it does not preserve the security of their devices. For instance, a person simply observing a user unlocking his/her phone (e.g., over the shoulder attack) can easily figure out the four-digit passcode or the gesture used to unlock the device. As a result, an authentication technique that prevents such over the shoulder attacks is desirable. Such a technique should be easy for the user to perform on the device, but hard for other users to replicate even after seeing the actual user performing it. Other devices employ a dedicated fingerprint reader for authentication. The fingerprint reader can add considerably to the overall cost of the device and require dedicated real-estate on the device. The present concepts can gather information about the user when the user interacts with the device, such as when the user performs an authentication gesture relative to the device. The information can be collectively analyzed to identify the user at a high rate of reliability. The concepts can use many types of sensor data and can be accomplished utilizing existing sensors and/or with additional sensors.

Some mobile device implementations are introduced here briefly to aid the reader. Some configurations of the present implementations can enable user-authentication based solely on generic sensor data. An underlying principal of this approach is that different users perform the same gesture differently depending on the way they interact with the mobile device, and on their hand's geometry, size, and flexibility. These subtle differences can be picked up by the device's embedded sensors (i.e., touch, accelerometer, and gyro), enabling user-authentication based on sensor fingerprints. Several authentication gesture examples are discussed that provide relatively high amounts of unique user information that can be extracted through the device's embedded sensors.

While the user performs the authentication gesture, these implementations can leverage the touch screen sensor to extract rich information about the geometry and the size of the user's hand. In particular, the information can relate to the distance and angle between fingers, the precise timing that each finger touches and leaves the touch screen, as well as the size and pressure applied by each finger. At the same time, these implementations can leverage the embedded accelerometer and gyro sensors to record the mobile device's displacement and rotation during the gesture. Every time a finger taps the screen, the mobile device is slightly displaced depending on how the user taps and holds the mobile device at the time of the gesture.

The present implementations can utilize multiple biometric features (e.g., parameters) that are utilized as the user interacts with the device to identify the user. User interaction with the device tends to entail movement of the user (and/or the device). In some of the present implementations, the movement can relate to an authentication gesture (e.g., log-in gesture). During a training session, the user may repeatedly perform the authentication gesture. Values of multiple different biometric features can be detected from the training authentication gestures during the training period. A personalized similarity threshold value can be determined for the user from the values of the training authentication gestures. Briefly, the personal similarity threshold can reflect how consistent (or inconsistent) the user is in performing the authentication gesture. Stated another way, the personalized similarity threshold can reflect how much variation the user has in performing the authentication gesture.

Subsequently, a person can perform the authentication gesture to log onto the device (or otherwise be authenticated by the device). Biometric features values can be detected from the authentication gesture during log-in and compared to those from the training session. A similarity of the values between the log-in authentication gesture and the training session can be determined. If the similarity satisfies the personalized similarity threshold, the person attempting to log-in is very likely the user. If the similarity does not satisfy the personalized similarity threshold, the person is likely an imposter.

From one perspective, the user-authentication process offered by the present implementations can be easy and fast for users to perform, and at the same time difficult for an attacker to accurately reproduce even by directly observing the user authenticating on the device.

System Scenarios

FIGS. 1-4 collectively show a first system 100 that includes a multi-feature authentication gesture implementation. In this case, the system includes a device 102, in the form of a display device, that includes (or is coupled to) one or more types of sensors 104 and a display or screen 106. In this example, the sensors include multiple cameras for capturing a region in front of the display device. In some cases, the sensors can be manifest as 3-D cameras, such as are employed by Microsoft® Kinect® brand 3-D sensors. The sensors can capture multiple biometric features about a user 108 as the user performs an authentication gesture. The multiple biometric features can be utilized to determine whether the user is authentic or not.

Figure 3:
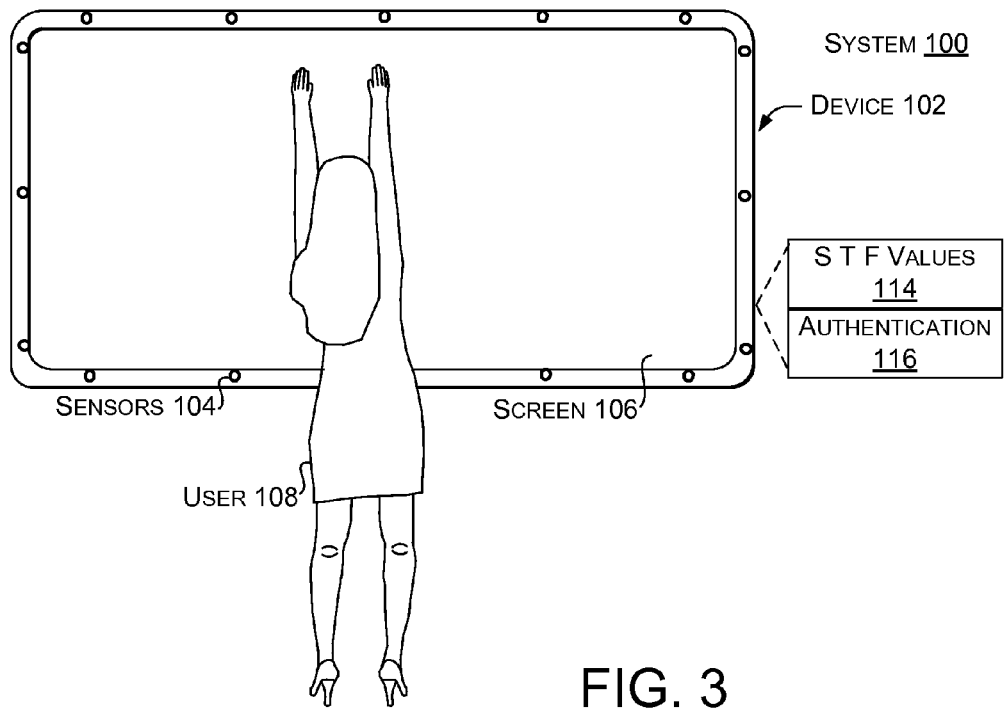

User 108 can perform an authentication gesture, which in this case is a non-touch authentication gesture, that starts with the user's arms spread fully out to each side with fingers spread apart (FIG. 1). The user then sweeps her arms upward (FIG. 2) and finishes the authentication gesture with her arms parallel and vertical with fingers together (FIG. 3). Of course, this is only one non-limiting example of an authentication gesture and other examples are illustrated relative to FIGS. 5-7, 9-12 and 13-17.

Sensors 104 can capture sensor data related to the authentication gesture. The sensor data can relate to various features. The features can be absolute, such as overall fingertip to fingertip width as designated at 110 (FIG. 1), and/or relative, such as the angles between each of the fingers (one of these angles is designated at 112), relative finger lengths, finger length relative to arm length, arm length relative to overall fingertip to fingertip width, etc. (the latter features are not designated with specificity to avoid clutter on the drawing page). Other features can relate to time, such as how long the user takes to complete the authentication gesture from arm spread (FIG. 1) to arms extended upward (FIG. 3). Other features are discussed relative to FIGS. 5-16. Note that any type of authentication gesture can be utilized. Authentication gestures that provide relatively high numbers of features tend to provide better accuracy (e.g., successfully distinguish the true user from an imposter).

Feature values from the sensor data of the authentication gesture can be compared to feature values stored from a training session (e.g., stored training feature (S T F) values 114) to distinguish the true user from an imposter. In some cases, the comparison can be performed by an authentication component 116. The authentication component 116 can utilize various techniques to compare the sensed feature values to the stored feature values to authenticate the user. One of the implemented comparison techniques involves similarity. A similarity of the sensed feature values to the stored feature values can be determined. The similarity can be compared to a similarity threshold. In some implementations, the similarity threshold can be customized to the user based upon the stored feature values of the training session. One such implementation is described in detail below relative to FIGS. 8-17.

Figure 4:
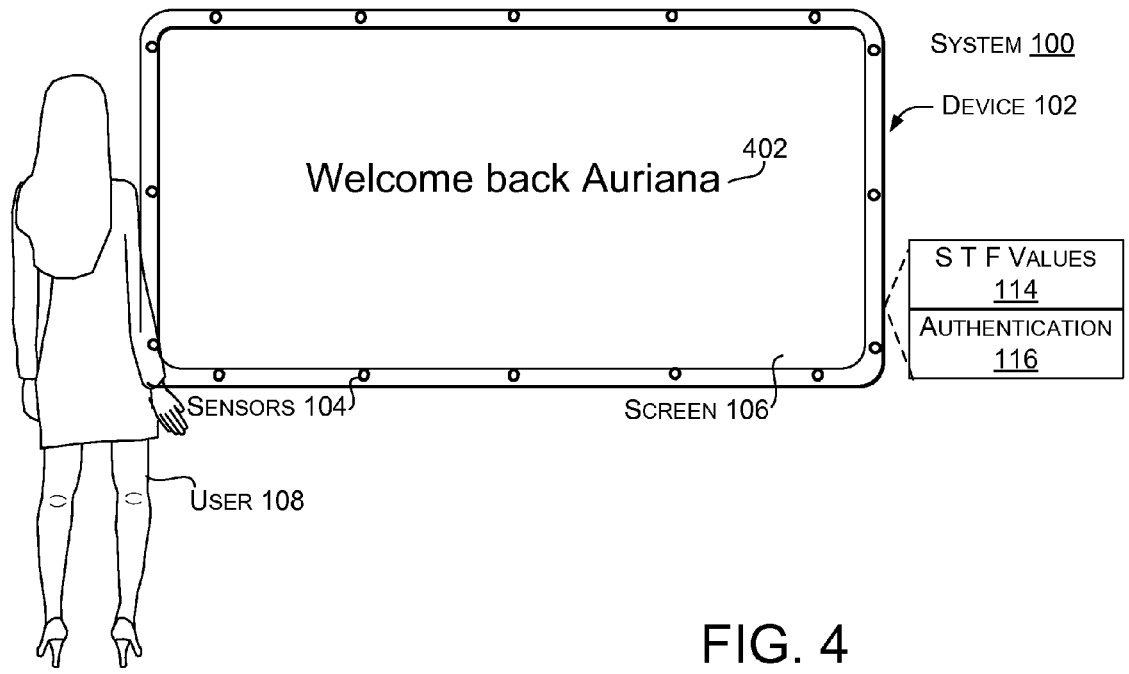

FIG. 4 shows an instance where the similarity satisfies the similarity threshold and the user (e.g., Auriana) is authenticated on the display device as indicated at 402.

FIGS. 5-7 collectively show a second system 500 that includes a multi-feature authentication gesture implementation. In this case, the system includes a device 502, in the form of a tablet type computer. The device includes multiple types of sensors 504, such as cameras and touch-sensors associated with a touch screen or touch display 506. For instance, the touch screen can include capacitive touch sensors that can sense a contact location and a contact pressure.

In this case, authentication starts with the user placing his/her hand 508 palm side down and flat on the touch screen 506 with the fingers spaced apart (FIG. 5). The user then draws the fingers together and lifts the palm away from the touchscreen (FIG. 6) such that the fingertips maintain contact with the touch screen 506. The authentication gesture finishes with the fingers touching one another underneath the palm (FIG. 7). This authentication gesture can provide multiple features that can be sensed by the device. For instance, the features can relate to actual dimensions such as finger length and width, palm width and length, fingerprints, palm print, total contact area at the start of the authentication gesture, and/or total contact area at the conclusion of the authentication gesture, among others. As mentioned above, the feature values sensed during the authentication gesture can be compared to stored training feature values 514 by authentication component 516 to determine whether the user performed the authentication gesture or an imposter attempted to access the device.

Note that some implementations can alternatively or additionally utilize other features that do not relate to the authentication gesture. For instance, some implementations can utilize features associated with face recognition to help identify the user. However, features related to the authentication gesture tend to be less influenced by environmental factors than other features. For instance, face recognition features can be influenced by lighting conditions, presence or absence of facial hair, whether the person's face is directly aligned with the device's camera or to the side, etc. In contrast, features related to the authentication gesture, such as finger length, angle between fingers, contact pressure, etc. tend to be more consistent and less influenced by environmental factors.

FIGS. 8-18 collectively show additional multi-feature authentication gesture implementations.

Figure 8:
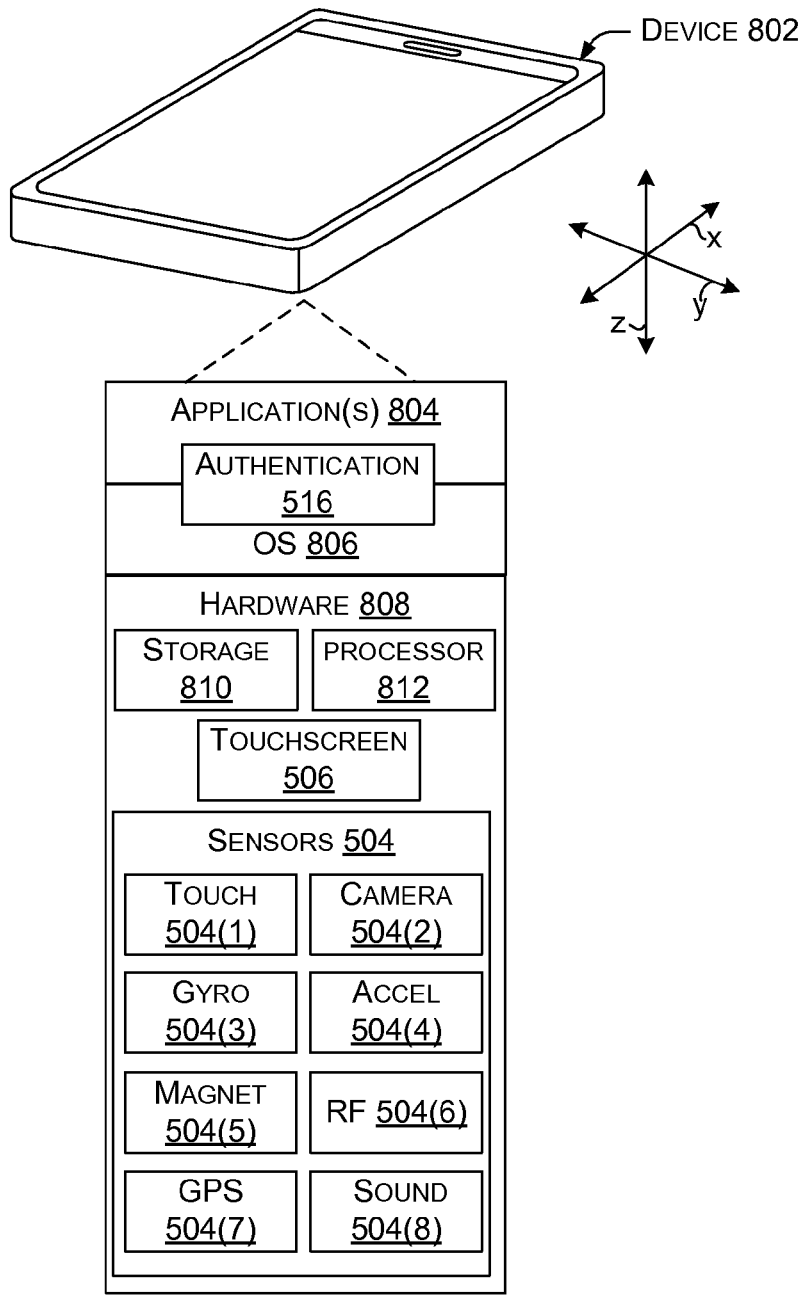

FIG. 8 shows a third system 800 that includes multi-feature authentication gesture implementations. In this case, the system includes a device 802, in the form of a smartphone. Device 802 can support an application(s) 804 running on an operating system (OS) 806. The operating system can interact with hardware 808. Examples of hardware can include storage media or storage 810, processor(s) 812, a touch screen 506, and/or sensors 504. Further, authentication component 516 can function in cooperation with application(s) 804 and/or operating system (OS) 806 and sensors 504. Non-limiting examples of sensor types can include touch sensors 504(1), cameras 504(2), gyroscopes 504(3), accelerometers 504(4), magnetometers 504(5), radio frequency (RF) sensors 504(6) (e.g., antenna), global positioning system (GPS) sensors 504(7), sound sensors 504(8) (e.g., microphone), among others. In some cases parentheticals are utilized after a reference number to distinguish like elements. Use of the reference number without the associated parenthetical is generic to the element. The sensors 504 can capture features, such as during the user-authentication gestures. The features can be used by the authentication component 516 as described below.

In this case, the device 802 includes a touch screen 506 that includes (or works in cooperation with) touch sensors 504(1). For instance, the touch screen can include capacitive touch sensors that can sense features such as contact location and a contact pressure. The device can also have other touch sensors, such as on the device housing and/or along the edge of the touch screen.

From one perspective, device 802 can be thought of as a computer. Processor 812 can execute data in the form of computer-readable instructions to provide a functionality. Data, such as computer-readable instructions and/or user-related data, can be stored on storage 810, such as storage that can be internal or external to the computer. The storage can include any one or more of volatile or non-volatile memory, hard drives, flash storage devices, and/or optical storage devices (e.g., CDs, DVDs etc.), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

In some configurations, device 802 can include a system on a chip (SOC) type design. In such a case, functionality provided by the device can be integrated on a single SOC or multiple coupled SOCs. One or more processors can be configured to coordinate with shared resources, such as memory, storage, etc., and/or one or more dedicated resources, such as hardware blocks configured to perform certain specific functionality. Thus, the term "processor" as used herein can also refer to central processing units (CPU), graphical processing units (GPUs), controllers, microcontrollers, processor cores, or other types of processing devices.

Generally, any of the functions described herein can be implemented using software, firmware, hardware (e.g., fixed-logic circuitry), manual processing, or a combination of these implementations. The term "component" as used herein generally represents software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the component are platform-independent, meaning that they may be implemented on a variety of commercial computing platforms having a variety of processing configurations.

The authentication component 516 can generate one or more GUIs that show the user how to perform an authentication gesture. For instance, at initial device start-up the authentication component can generate GUIs that illustrate how to perform the authentication gesture. The authentication component 516 can generate a GUI that instructs the user to perform the authentication gesture a number of times. The user can perform the authentication gestures as instructed. The authentication component can store this information as the training data. This aspect is discussed in more detail below relative to FIG. 18. Other implementations may show multiple authentication gestures and allow the user to select an authentication gesture to utilize. Still other implementations may allow the user to define his/her own authentication gesture. The user may access the authentication component 516, such as under a settings menu, to change his/her authentication gesture(s) and/or to perform additional training, among other functions.

Note that in some of the present implementations, the authentication component 516 can achieve accurate multi-feature gesture authentication utilizing existing sensors that are normally found on off-the-shelf devices, such as smartphones. Thus, the present implementations can be achieved with very little cost increase over existing products yet can provide greater user convenience and security. Further, if future devices employ additional and/or different sensor types, the present implementations can utilize features captured by the new sensor types.

Figure 9:
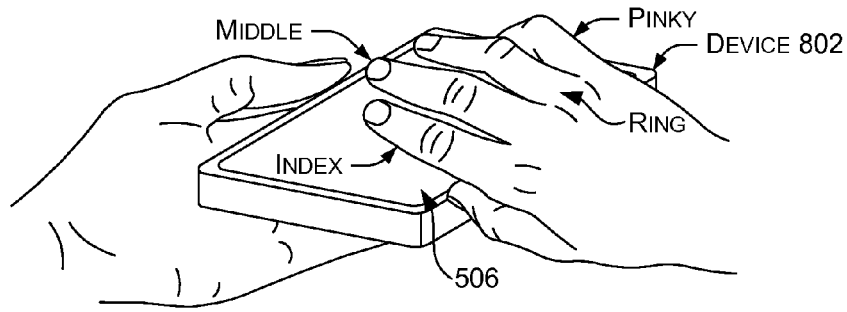
Figure 10:
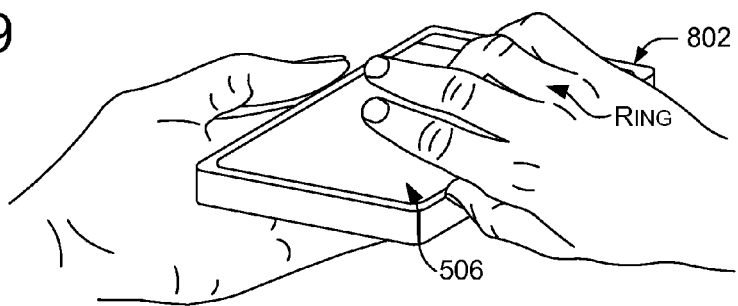
Figure 11:
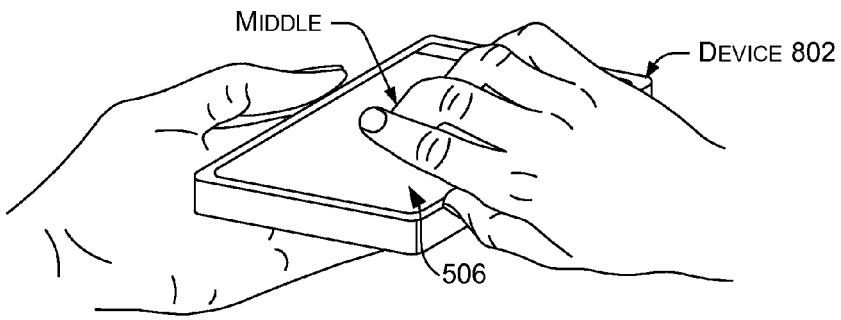
Figure 12:
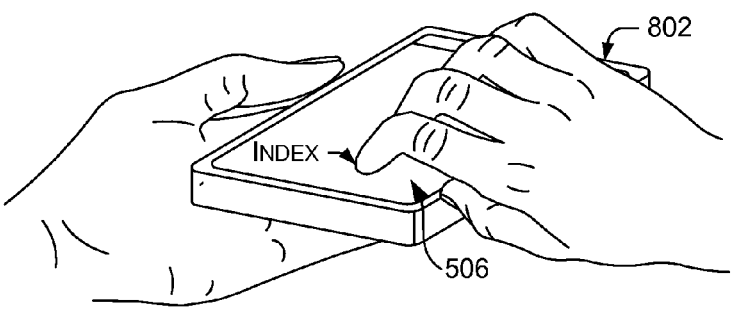
Figure 13:
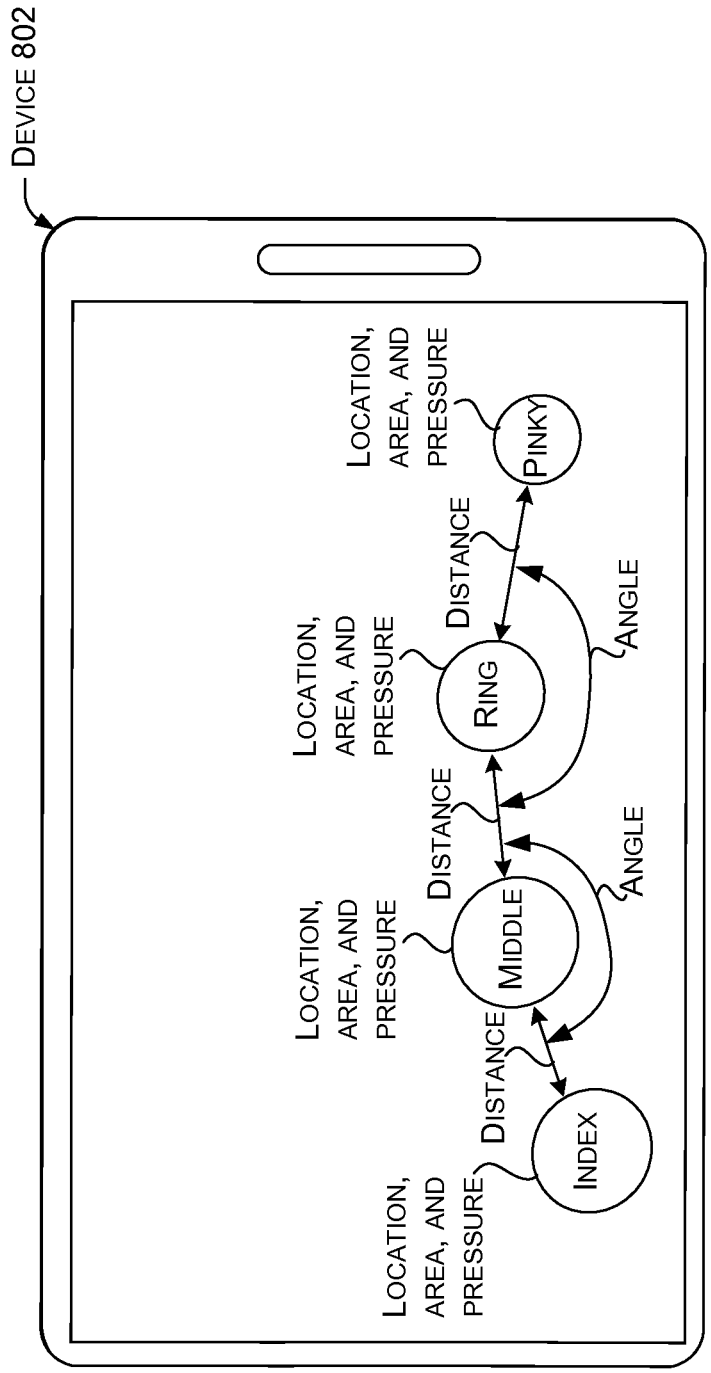
Figure 14:
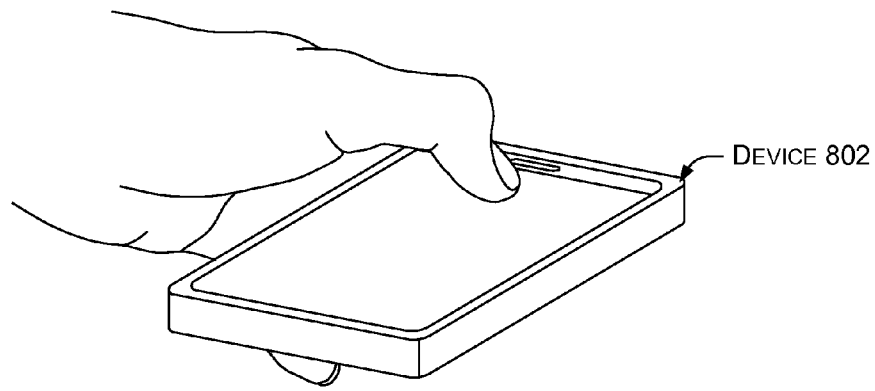
Figure 15:
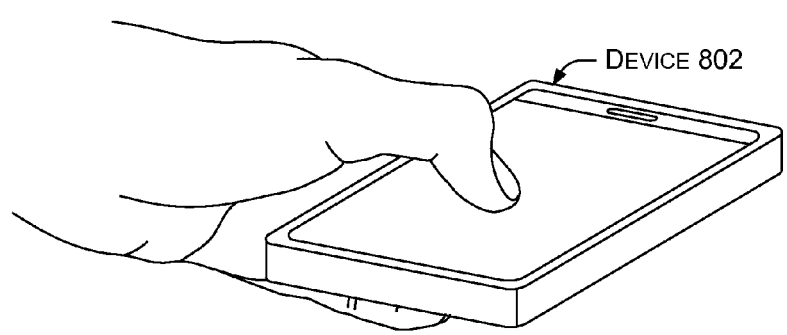
Figure 16:
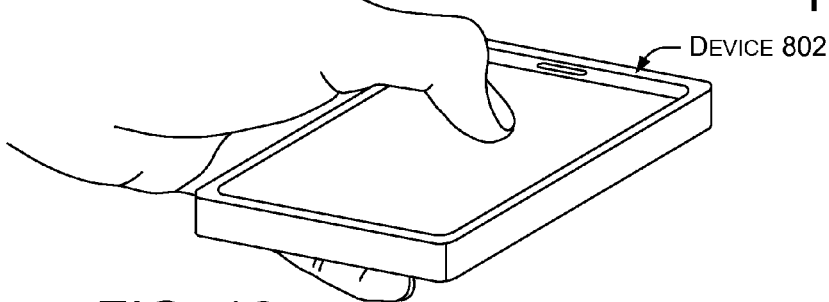

FIGS. 9-12 show a multi-touch authentication gesture that is performed while the user holds the device 802 with one hand and performs the authentication gesture with the other. In FIG. 9, the user's pinky contacts the touchscreen as the user starts the authentication gesture. In FIG. 10 the user's ring finger contacts the touchscreen and in FIG. 11 the user's middle finger contacts the touchscreen. In FIG. 12 the user finishes the authentication gestures as the index finger contacts the touchscreen. FIG. 13 shows examples of features that can be captured from the authentication gesture by the touch sensors 504(1).

Figure 17:
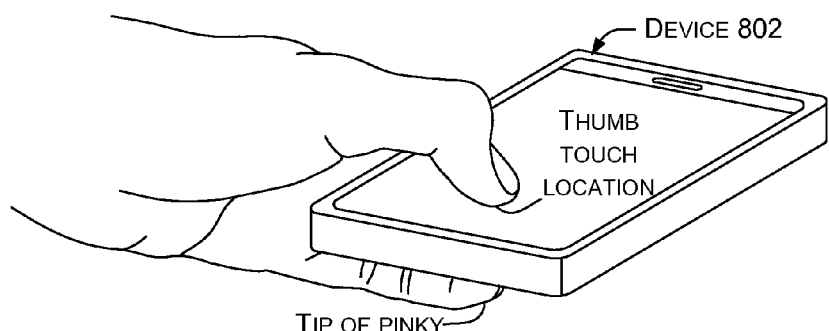

FIGS. 14-17 show an implementation where the user holds the device 802 with one hand and performs the authentication gesture with the same hand. In this case, the user uses his/her thumb to contact the touchscreen at a location directly over the tip of the underlying support fingers. In this example, the order of contact is over the index finger (FIG. 14), then the middle finger (FIG. 15), followed by the ring finger (FIG. 16) and finishing over the pinky finger (FIG. 17). (Due to constraints of the drawing page only the authentication gesture contact at the location over the pinky finger is directly visible).

Both of these implementations (e.g., FIGS. 9-12 and FIGS. 14-17) can allow multiple features to be captured relative to the authentication gesture that relate to the geometry of the user's hand(s). As the user performs the gesture with four fingers, the system 800 can simultaneously record the location on the touch screen and the time at which each finger first touched and later left the device's touchscreen. While the person is performing the gesture, the system can also record the accelerometer and gyro signatures of the device that indicate how the person is holding the device. The authentication component 516 can combine this information to extract a set of features, such as time each finger touches the touch screen, distance between fingers, angle between touches, (see FIG. 13) etc., that can be used to train an authentication model for the user (e.g., the training session). In order to fake such a gesture, the attacker needs to simultaneously replay the timing, distance, angle, and sensor characteristics of the user's gesture, something quite hard to achieve.

The present implementations can leverage the fact that different users perform the same gesture differently depending on the way they hold the device, and on their hand's geometry, size, and flexibility. These subtle differences can be picked up as features by the device's embedded sensors (i.e., touch, accelerometer, and gyro), enabling user-authentication based on sensor fingerprints.

Stated another way, while the user performs the authentication gesture, the authentication component 516 can leverage the touch-screen sensor to extract rich information about the geometry and the size of the user's hand. In particular, the distance and angle between fingers, the precise timing that each finger touches and leaves the touchscreen, as well as the size and pressure applied by each finger can be extracted. At the same time, the authentication component 516 can leverage the embedded accelerometer and gyro sensors to record the device's displacement and rotation during the gesture. Note that every time a finger taps the touch screen, the device is slightly displaced depending on how the user taps and holds the device at the time of the gesture.

When combined, the information from touch, accelerometer, and gyro sensors (among others) can provide a detailed view into how the individual user performs the authentication gesture. The authentication component 516 can utilize this information as a 'sensor fingerprint' to authenticate the user. (A sensor fingerprint should not be confused with a sensor capturing the user's actual fingerprint. However, in some implementations, the user's actual fingerprint or fingerprints could contribute to his/her sensor fingerprint).

Since the illustrated authentication gestures can be quite intuitive/natural, and can be performed anywhere on the touchscreen, they don't impose a significant cognitive overhead for users. At the same time, attackers willing to attack this authentication mechanism face a much harder task as they have to simultaneously reproduce the timing, placement, size, and pressure of each finger tap, as well as the accelerometer and gyro sensor signatures. Even though faking each of this information individually might be easy, simultaneously reproducing all this information is quite challenging even when the attacker has the opportunity to closely observe the actual user performing the authentication gesture.

In summary, the authentication gestures shown in FIGS. 9-12 and 14-17 provide examples of authentication gestures that allow the device's existing embedded sensors to extract a large amount of information about the user's hand biometrics and the way the user holds the device.

In both cases, four finger taps are recorded through the touchscreen layer in the form of pixel coordinates. Since each of the recorded touch points directly (2-hand gesture) or indirectly (1-hand gesture) corresponds to a fingertip, the touchscreen sensor 504(1) can capture the geometry of the user's hand. In particular, the distance between every pair of fingertips, as well as the angles defined by any combination of three fingertips (FIG. 13) can be used to characterize the size and geometry of the user's hand. At the same time, the timestamps of the finger taps highlight the speed at which the user is able to flex his/her fingers to perform the required gesture. The duration of each finger tap, as well as the timing between pairs of finger taps varies across users depending on the size and flexibility of the user's hand.

The touchscreen layer on most devices, such as smartphones, is also able to record the pressure and size of each finger tap. Both of these values depend on the size and weight of the user's hand, on how much pressure the user applies on the display, as well as on the angle at which the user holds the device while performing the gesture.

The accelerometer sensor 504(4) and gyro sensors 504(3) can complement the touch sensors 504(1) by indirectly capturing additional information about the user's hand biometrics. Every time a user performs one of the authentication gestures, the device 802 is slightly displaced and rotated. The displacement and rotation of the device is clearly reflected in the accelerometer and gyro sensor data. During every finger tap as well as slightly before and after the gesture, there is significant variation in the accelerometer and gyro sensor signatures. In the case of the two-hand authentication gesture, these variations are caused by two sources: the fingers tapping on the device's display, as well as the second hand of the user trying to compensate for, and support the device for the finger taps. In the case of the one-hand gesture, device displacement and rotation is mainly caused by the size of the user's hand and the reach/length of the user's thumb with respect to the length of the other fingers and the size of the device itself.

In summary, the authentication component 516 can combine the information from touch, accelerometer, and gyro sensors, among others, to form a sensor fingerprint that captures the geometry and biometrics of the user's hand.

Even though intuitive, the use of this type of sensor data for user-authentication poses several challenges. First, the recorded sensor data can vary across different gesture instances depending on how the actual user performs the gesture or holds the device 802. Even worse, this variability can be user-specific. For instance, some users can be very accurate in reproducing the exact timing or distance between the finger taps, but fail to accurately reproduce other parts of the sensor data, such as the pressure or angle signatures, and vice versa. Towards this end, in some of the present implementations, the authentication component 516 can employ authentication techniques that are automatically tailored to the capabilities of each user.

To enable direct comparison of the sensor fingerprints across users and gesture instances, the authentication component 516 can employ personalized similarity metrics for both, the discrete touch sensor readings, as well as the continuous accelerometer, and gyro data. The personalized similarity metrics are designed to emphasize more on those features of the sensor data that exhibit the least variability across gesture instances, and thus are valuably descriptive of user's gesture input behavior.

Further, in some implementations, the authentication 516 can consider device resources when considering sensing configurations. For instance, current mobile devices support high sensor sampling rates that can be as high as 200 KHz or higher. Continuously sampling sensors like accelerometers at this rate for half a second or more (time it can take the user to perform the authentication gesture) can produce large amounts of data that take significant time (and or other resources) to process locally. These delays can slow down the device authentication process, potentially rendering the technique too slow to satisfy user expectations. To address this problem, some implementations can exploit the tradeoff between sensor down sampling and overall accuracy. Appropriate down sampling of sensor data can achieve device authentication times that are satisfactory to the user without sacrificing recognition accuracy.

Third, traditional approaches to machine learning cannot be directly applied to establish a probabilistic model of the way the user performs the gestures. Discriminating models tend to require both positive and negative data during the training phase. Unfortunately, the user's device only has access to the gesture instances of the true user (positive data, such as from the training session). Generative models do not require negative data, but are limited by the large number of training samples they require. Asking users to perform the unlock gesture thousands of times in a training session immediately after buying their new device tends to not be acceptable to users.

In the absence of negative training data, and with a limited number of training gestures available, in some of the present implementations the authentication component 516 can employ a personalized thresholding technique for validating the authenticity of a sensor fingerprint. Specifically, some implementations can characterize the variability in the sensor fingerprints across gesture instances for a given user, and use it to generate a personalized similarity threshold. In that way, the more consistent a sensor fingerprint is across gesture instances for a user, the higher the personalized similarity threshold for the user will be, and vice versa.

Architecture

Figure 18:
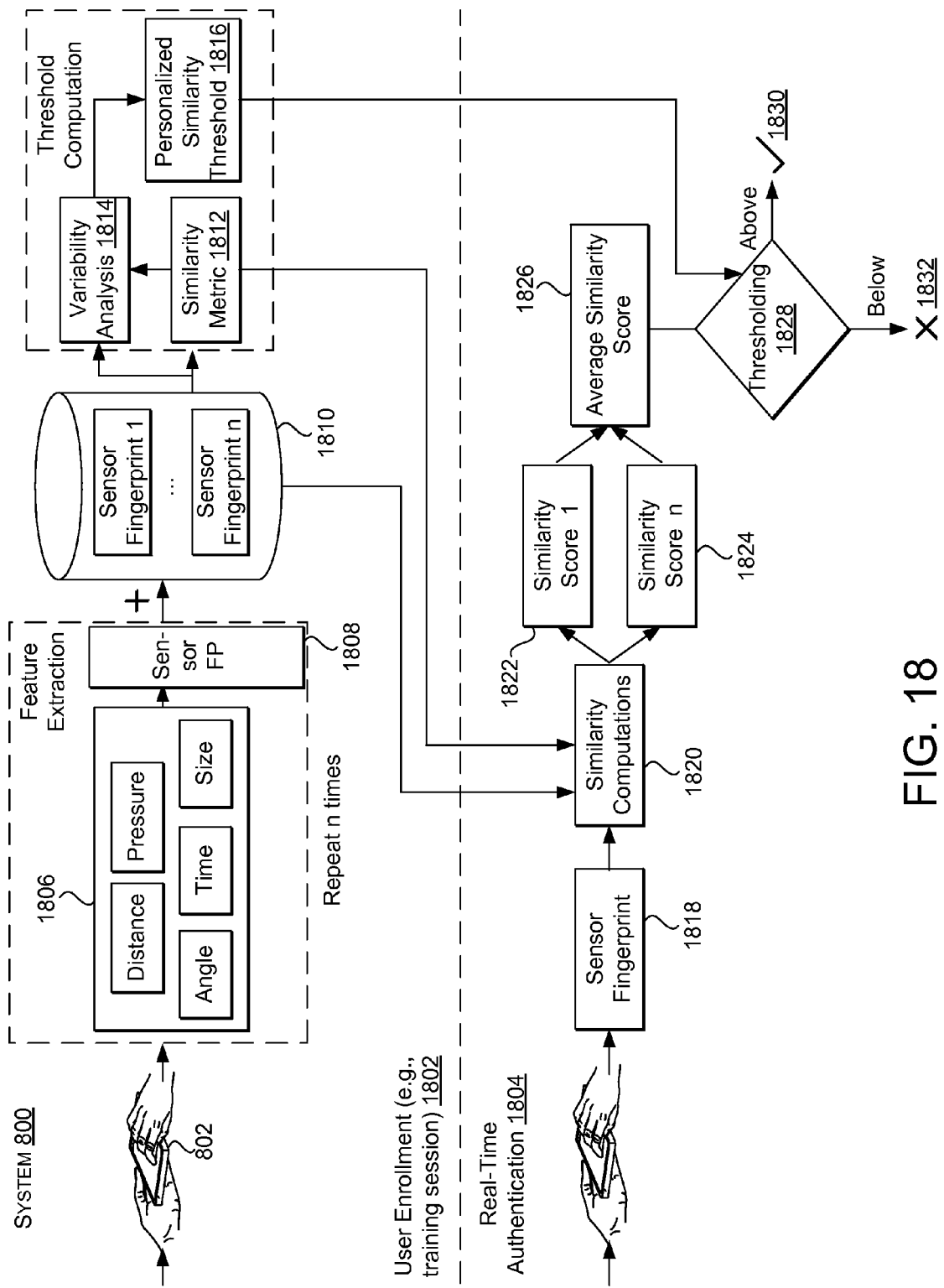

FIG. 18 provides an overview of an example system architecture of the sensor-based authentication system 800 introduced above. During a user enrollment phase (e.g., training session) 1802. Information from the training session can subsequently be used for real time authentication 1804. During the training session 1802, the true user can repeatedly perform the authentication gesture on the touch-enabled device 802. For ease of discussion, authentication gestures performed during the training session may be referred to as training gestures. For each training gesture, multiple sensor types, including touch sensors, can detect and record finger taps and extract information about the timing, distance, and angle between each pair of taps, as well as the pressure and size of each finger tap (for instance, see FIG. 13). At the same time, the accelerometer and gyro sensors can be continuously sampled to capture the displacement and rotation of the device during the training gesture. These features are represented at 1806. The feature data extracted from the finger taps, along with the raw accelerometer and gyro data can contribute to the actual sensor fingerprint for the user as indicated at 1808. In that way, multiple sensor fingerprints across different training gesture instances are collected (labeled sensor fingerprint 1 through sensor fingerprint n as represented at 1810). This collection of sensor fingerprints represents the identity of the user in the sensor domain and is analogous to the stored training feature values 514 introduced above relative to FIG. 5.

Note that a similar or identical processing pipeline can be used for the authentication gestures illustrated in FIGS. 9-12 and 14-17. In both cases, the accelerometer and gyro sensors can be continuously sampled, and exactly four finger taps are recorded through the touch sensor at the processing layer. (Of course, other non-illustrated authentication gestures can use fewer than four finger taps or more than four finger taps.)

In summary, the user may train more than one authentication gesture type for inclusion at 1810 via multiple training sessions (or sub-sessions). For instance, the user may want to train the authentication gesture shown in FIGS. 9-12 as well as the authentication gesture shown in FIGS. 14-17, and/or another authentication gesture where the device is placed on a rigid surface such as a tabletop while the gesture is performed. In such a case, the user could perform a set of training authentication gestures for each configuration. The sets could then be used for comparison at run time (e.g., real-time authentication 1804).

In order to determine if a random sensor fingerprint obtained during real-time authentication 1804 belongs to the true user or not, the system can employ a way to quantify the similarity of two sensor fingerprints. Toward this end, some of the present implementations can employ a similarity metric 1812 that takes into account the unique gestural behavior of the user to quantify how close two sensor fingerprints are. Given this similarity metric, the present implementations can analyze the variability 1814 of the recorded sensor fingerprints for a given user, such as from the training gestures (when the user trains multiple gestures, the variability can be within the set associated within an individual gesture type). The system can derive or compute a personalized similarity threshold or authentication threshold 1816 for admitting or rejecting an unknown sensor fingerprint (e.g., from the authentication gesture). The intuition behind this approach is that the variability in the sensor fingerprints can be different across users. For those users with low variability, a stricter personalized similarity threshold should be enforced, while for users with high variability, a more lenient personalized similarity threshold should be adopted to properly balance false positives and false negatives.

At run time (e.g., real-time authentication 1804), every time a user performs the authentication gesture, the system can record a new sensor fingerprint 1818. The system can compute the similarity 1820 of this authentication gesture sensor fingerprint to the true user (e.g. the training user) as the average similarity between the authentication gesture sensor fingerprint and every single sensor fingerprint recorded in the training session (e.g., sensor fingerprints 1-n) as indicated at 1822 and 1824 respectively. This produces the average similarity score 1826. At 1828, the system only authenticates the user performing the authentication gesture if the average similarity score 1826 for the recorded fingerprint satisfies the personalization similarity threshold at 1830, otherwise the device remains locked at 1832.

Note that the entirety of the described system architecture can be manifest on device 802. Alternatively, device 802 can operate cooperatively with other devices that may store sensor fingerprints and/or perform processing on behalf of the device.

The discussion below describes examples of how sensor fingerprints can be formed, the personalized similarity metric, and the personalized threshold identification techniques.

Sensor Fingerprints

Touch, accelerometer, and gyro sensor data, among others, can be combined to form the sensor fingerprint. In the case of accelerometer and gyro sensors, the process is straightforward as the raw sensor data can be directly used as part of the sensor fingerprint. In the case of the touch sensor, a two-step process can be applied to extract the most detailed information about the user's hand geometry and biometrics. First, the locations of the finger taps on the touchscreen can be used to extract an initial set of absolute features. Then a set of relative features can be computed directly on top of the absolute features.

Absolute Features

The touch sensor can report three distinct types of information for each finger tap: pixel location, pressure, and size. Both pressure and size can be continuously reported for as long as the finger touches the touch screen. Given that the variation of pressure and size is quite small for each finger tap, the system can average all the reported pressure and size values, and use them as two distinct features. Given the four finger taps, four pressure and four size values can be generated (Table 1).

The system can extract the majority of the touch-based features directly from the pixel locations of the four finger taps. Note that all features extracted only depend on the relative, and not absolute, pixel locations of the finger taps. In that way, the user does not have to perform the finger taps on specific locations on the screen. This would increase the cognitive overhead for the user, make the authentication gesture harder to perform, and significantly increase the variability of the data recorded, thus reducing its ability to be used for user-authentication.

Some implementations can begin by computing the distances in the pixel location space for every pair of finger taps. In that way, six feature values can be computed (Table 1). At the same time, every combination of three finger taps uniquely defines an angle (FIG. 13). Some implementations can consider all possible angles defined by a set of three finger taps, and generate an additional four features (Table 1).

TABLE 1

Features extracted from the display locations of the four finger taps. Note that all features depend on the relative, and not absolute, locations of the finger taps. Users can perform the authentication gesture anywhere on the screen.

| Feature Type | Features | Number of Features |
|---|---|---|
| Distance | $D_{1,2}, D_{1,3}, D_{1,4}, D_{2,3}, D_{2,4}, D_{3,4}$ | 6 |
| Angle | $A_{1,2,3}, A_{1,2,4}, A_{1,3,4}, A_{2,3,4}$ | 4 |
| Size | $S_1, S_2, S_3, S_4$ | 4 |
| Pressure | $P_1, P_2, P_3, P_4$ | 4 |
| Duration | $Dur_1, Dur_2, Dur_3, Dur_4$ | 4 |
| Start Time Difference | $STD_{1,2}, STD_{1,3}, STD_{1,4},$ $STD_{2,3}, STD_{2,4}, STD_{3,4}$ | 6 |
| End Time Difference | $ETD_{1,2}, ETD_{1,3}, ETD_{1,4},$ $ETD_{2,3}, ETD_{2,4}, ETD_{3,4}$ | 6 |
| Distance Ratio | $\dfrac{D_{1,2}}{D_{2,3}}, \dfrac{D_{1,2}}{D_{3,4}}, \dfrac{D_{2,3}}{D_{3,4}}$ | 3 |
| Size Ratio | $\dfrac{S_1}{S_2}, \dfrac{S_1}{S_3}, \dfrac{S_1}{S_4}, \dfrac{S_2}{S_3}, \dfrac{S_2}{S_4}, \dfrac{S_3}{S_4}$ | 6 |
| Pressure Ratio | $\dfrac{P_1}{P_2}, \dfrac{P_1}{P_3}, \dfrac{P_1}{P_4}, \dfrac{P_2}{P_3}, \dfrac{P_2}{P_4}, \dfrac{P_3}{P_4}$ | 6 |
| Duration Ratio | $\dfrac{Dur_1}{Dur_2}, \dfrac{Dur_1}{Dur_3}, \dfrac{Dur_1}{Dur_4}, \dfrac{Dur_2}{Dur_3}, \dfrac{Dur_2}{Dur_4}, \dfrac{Dur_1}{Dur_4}$ | 6 |
| Total number of features | | 55 |

The temporal signature of the authentication gesture can be as important as the spatial one defined by the distance and angle features. The touch sensor can report a start and end timestamp for every finger tap, indicating the time the finger initially touched the screen and the time it lost contact. These timestamps can be used to compute the total duration of each finger tap, as well as the time that elapses between the start and end time between every pair of fingerprints. In that way, the timing of each finger tap, as well as the timing across finger taps is accurately captured. As shown in Table 1, 18 temporal features are computed in one implementation.

Relative Features

Relative features can be thought of as ratio-based features for distance, pressure, size, duration, among others. For instance, a relative feature can be a ratio of the distance between the pinky and ring finger touches to the distance between the ring finger and middle finger touches.

Comparing Sensor Fingerprints

In this implementation, each sensor fingerprint contains the 55 touch features summarized in Table 1 and the raw sensor patterns of the accelerometer and gyro sensors. When comparing sensor signatures across gestures, different techniques can be used to quantify the difference of the touch features and that of the sensor patterns.

Touch Features

For purposes of explanation let $F^1$ and $F^2$ be the set of the 55 touch features recorded across two gesture instances. The system can quantify the difference $D_{touch}$ between these feature sets as the weighted average difference across all features:

$$D_{touch} = \sum_{i=1}^{55} W_i D_{F^1(i),F^2(i)} \qquad (1)$$

where $W_i$ is the weight for feature i, and $D_{F^1(i),F^2(i)}$ is the difference between the values recorded for feature i at the two gesture instances.

The distance between feature values $F^1(i)$ and $F^2(i)$ is defined by their normalized numerical difference:

$$D_{F^1(i),F^2(i)} = \min\left\{\frac{|F^1(i) - F^2(i)|}{|F^1(i)|}, 2\right\} \qquad (2)$$

When the two feature values are identical, the difference score becomes 0. In general, the higher the difference for the feature value across the gesture instances, the higher the distance for that feature will be. However, to prevent a single feature from biasing the result of Equation 1, some implementations can limit the maximum value of the distance to 2. This can be particularly useful when most feature values across two gesture instances match closely, but one of them is significantly off (i.e. outlier or faulty measurement), say by 50×. Even though the two gesture instances are almost identical, when an upper bound is not used, this feature can significantly bias the distance score computed in Equation 1.

The weight $W_i$ of the feature i represents the importance of the feature for a given user. In general, when users repeat authentication gestures, they can accurately repeat feature values with varying degrees of success. The role of the weight is to emphasize on those features that a specific user can accurately reproduce across authentication gesture instances. Given a set of enrolled authentication gestures from a user, the weight for feature i is defined as:

$$W_i = \exp\left\{-\frac{\sigma_{F(i)}}{\mu_{F(i)}}\right\} \qquad (3)$$

where $\sigma_{F(i)}$ and $\mu_{F(i)}$ is the variance and mean of the values for feature i across all the enrolled gestures from the true user.

Sensor Patterns

In this implementation, each sensor fingerprint is comprised of six time series signals, each representing the acceleration and rotation of the device across the x, y, and z dimensions ($S_{accel_x}$, $S_{accel_y}$, $S_{accel_z}$, $S_{gyro_x}$, $S_{gyro_y}$, $S_{gyro_z}$). Even though a straight-forward approach to comparing these signals across gestures would be to simply compute the distance between them, such a method tends to fail due the noise in the sensor data. For instance, the total time to perform a gesture and the exact timing between finger taps inherently varies across gesture instances even for the same user. These variations can artificially increase the distance between the recorded traces.

Instead, the system can quantify the difference of these signals across gestures by combining two techniques for comparing time series data: dynamic time warping and cross-correlation. Both of these techniques allow direct comparison of the time series data while allowing for noise in the sensor data. Instead of comparing each corresponding sample between the recorded signals, a window of the signal is used to find the best possible match between the signals. Intuitively, the two signals are slightly shifted to enable the best possible match. This allows the system to take into account temporal differences across gesture instances.

Before comparing two signals, each signal can be normalized to zero mean and one energy to avoid favoring low energy over high energy signal pairs. Then, each signal can be further normalized by its length to avoid favoring short signals over long signals. In particular, each of the six time series data S(i) in the sensor fingerprint can be normalized as follows:

$$S(i) = \frac{S(i) - \mu_S}{\sum_{i=1}^{L}(S(i) - \mu_S)^2 L} \qquad (4)$$

where L is the length of the signal, and $\mu_S$ is the mean value of all signal samples.

Let $S_{accel_x}^1$ and $S_{accel_x}^2$ be the normalized accelerometer signals over the x axis that were recorded across two different gesture instances. Since they are recorded at different times, they might have different lengths, such as $L_{accel_x}^1$ and $L_{accel_x}^2$. To compare these two signals, the system can first compute the direct distance between every pair of samples in $S_{accel_x}^1$ and $S_{accel_x}^2$. In that way, a distance matrix $D_{accel_x}$ with $L_{accel_x}^1$ rows and $L_{accel_x}^2$ columns can be computed, where each element takes the following values:

$$D_{accel_x}^{ij} = |S_{accel_x}^1(i) - S_{accel_x}^2(j)|, 1 \le i \le L_{accel_x}^1, 1 \le j \le L_{accel_x}^2 \qquad (5)$$

In a similar way, distance matrices $D_{accel_y}$ and $D_{accel_z}$ are computed. The three distance matrices representing the difference in the x, y, and z dimensions of the accelerometer data can then be added together to form a single distance matrix:

$$D_{accel} = D_{accel_x} + D_{accel_y} + D_{accel_z}$$

The exact same process can be applied to the gyro data to generate a single distance matrix $D_{gyro}$ that encodes the difference in the gyro sensor data across the x, y, and z dimensions. At the end, accelerometer and gyro distance matrices can be combined into a single distance matrix:

$$D = D_{accel} + D_{gyro}$$

Note that the number of samples in the accelerometer and gyro streams might be different depending on the sampling rates the hardware supports for these sensors (usually gyro sensors offer lower sampling rates). As a result, matrices $D_{accel}$ and $D_{gyro}$ might have different dimensions. In this case, the system can up-sample the lower frequency signal to ensure that both $D_{accel}$ and $D_{gyro}$ have the same dimensions and can be properly added. Given that both gyro and accelerometer signals are initially normalized, the system can safely add the corresponding distance matrices.

Simply adding up the diagonal elements in matrix D, corresponds to the direct distance between the sensor fingerprints across the two authentication gestures. However, given the variability in the way users perform the authentication gesture (slightly different timing etc.), direct distance can be quite inaccurate. Instead, the system can define a window along the diagonal of the final distance matrix D that allows compensation for time differences across authentication gestures. In particular, the system can define a search space across the diagonal defined by $C_{DTW}$:

$$D_{ij} = \infty (|i-j| \ge C_{DTW}) \qquad (6)$$

where $C_{DTW}$ is the Dynamic Time Warping constraint.

By setting distances to infinity, the system can limit the search space along the diagonal, therefore limiting how much each signal is shifted. The distance between the two signals is now defined as the shortest warping path between the two diagonal points in matrix D:

$$D_{DTW} = \underset{p}{\operatorname{argmin}} \sum_{(i,j) \in p} D_{ij} \qquad (7)$$

where p is a warping path between the two diagonal points in the matrix.

When $C_{DTW}$ is equal to 1, the direct distance can be calculated as the sum of all the diagonal elements in matrix D. As the value of $C_{DTW}$ increases, more shifting of the two signals can be allowed.

Cross-Correlation

Similarly to the dynamic time warp approach, the system can combine the accelerometer and gyro sensor data across the x, y, and z dimensions to compute a single cross-correlation value as:

$$Corr = \underset{n \in [-c_{Corr}, c_{Corr}]}{\operatorname{argmax}} \sum_{k=1}^{P} \sum_{m=\max\{-n+1,1\}}^{\min\{L_{1k}-n, L_{2k}\}} S_{1k}(m+n) S_{2k}(m) \quad (8)$$

where $C_{Corr}$ is a constraint on the permitted shift amount of each signal under comparison. As before, shifting of the signals can be utilized to compensate for the slight temporal differences of the sensor signatures across gesture instances of the same user.

The scores produced by the dynamic time warping and cross-correlation techniques are combined together to quantify the overall distance between gestures in the sensor pattern domain:

$$D_{sensor} = D_{DTW} * (1 - \text{Corr}) \quad (9)$$

Combine Touch Features and Sensor Patterns

Equations 1 and 9 can quantify the difference between two gesture instances in the touch and sensor domain respectively. The system can combine touch features and sensor patterns by multiplying the corresponding difference scores:

$$D_{combined} = D_{touch} * D_{sensor} \quad (10)$$

Personalized Threshold

Equation 10 can quantify the difference between any pair of gesture instances, but it may not be enough to make a decision whether or not the two gestures belong to the same user. The reason is that users exhibit different gestural behavior. Some users can very accurately reproduce the touch and sensor signatures across gesture instances, while others might exhibit higher variability. As a result, a low or high score from Equation 10 can be interpreted differently across users.

The system can deal with this variability by defining a personalized threshold $P_{Th}$ for deciding when the difference between authentication gestures is low enough to assume they belong to the same user. Given N enrolled authentication gestures from a user, the system can define $P_{Th}$ for this user as:

$$P_{Th} = \mu D_{combined}^{ij} + 3\sigma_{D_{combined}^{ij}}, 1 \leq i,j \leq N, i \neq j \quad (11)$$

where the first term represents the median distance (Equation 10) between every pair of gestures that belong to the user, and the second term represents the standard deviation of these distances. These two values can quantify the variability in the sensor signatures across gesture instances for that user. Naturally, the threshold value for users that accurately reproduce sensor signatures across gesture instances will have a low $P_{Th}$ value, and vice versa.

In summary, the present system can employ any types of sensors available on a device to provide feature values captured during an authentication gesture to identify (or reject) a user. The sensors can be dedicated to the authentication gesture and/or sensors used for multiple purposes. Accurate implementations can be achieved utilizing existing sensors (of presently available mobile devices) for the additional authentication gesture functionality. Thus, user convenience and device security can be enhanced without additional hardware and its associate increased costs.

Example Techniques

Figure 19:
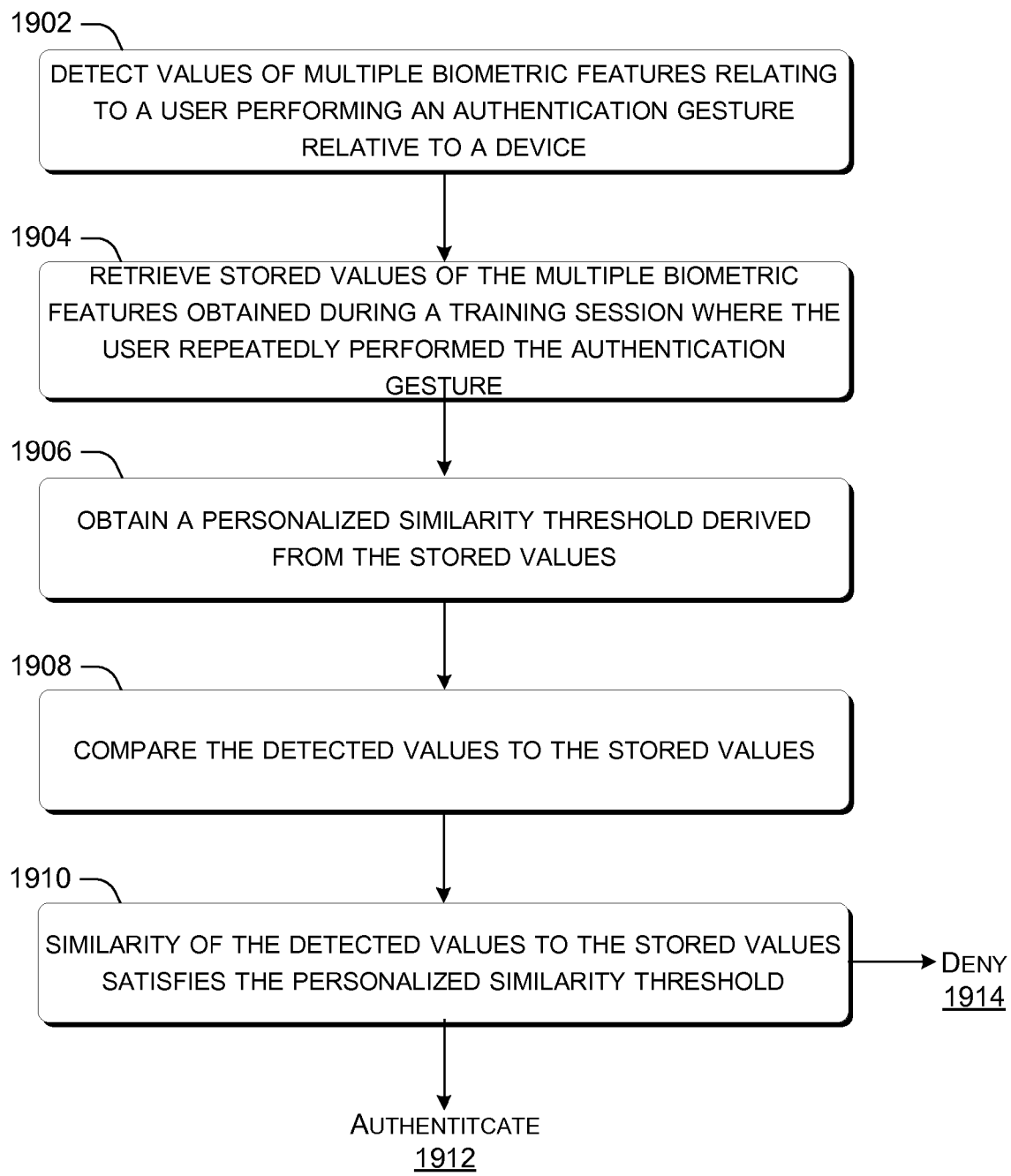
FIGS. 19-20 are flow diagrams of authentication gesture methods in accordance with some implementations.

FIG. 19 illustrates a flowchart of an authentication gesture verification technique or method 1900.

At block 1902 the method can detect values of multiple biometric features relating to a user performing an authentication gesture relative to a device. In cases where the authentication gesture is a multi-touch gesture on a touchscreen, examples of biometric features can relate to distance between every pair of fingers, angle between every three fingers, size of each finger's touch, pressure of each finger's touch, total time each finger continuously touches the touchscreen, difference in the start touch time between every pair of fingers, difference in the end touch time between every pair of fingers, ratios of finger distances, ratios of the finger sizes, ratios of the finger total touch times, and/or ratios of the finger pressures, among others. Other features can relate to how the user holds the device while performing the authentication gesture (e.g., rotation and/or displacement).

At block 1904 the method can retrieve stored values of the multiple biometric features obtained during a training session where the user repeatedly performed the authentication gesture (e.g., training gestures).

At block 1906 the method can obtain a personalized similarity threshold derived from the stored values. For instance, the personalized similarity threshold can account for the user's variability in performing the training gestures and how the variability affects individual features.

At block 1908 the method can compare the detected values to the stored values. As mentioned above some implementations can encompass multiple training gesture features, and the comparison can utilize an average value for each feature.

At block 1910 the method can evaluate the similarity of the detected values relative to the stored values. At block 1912, the method can authenticate the user on the device in an instance where a similarity of the detected values to the stored values satisfies the personalized similarity threshold. Otherwise, the authentication gesture can be rejected and access to the device can be denied at block 1914.

Figure 20:
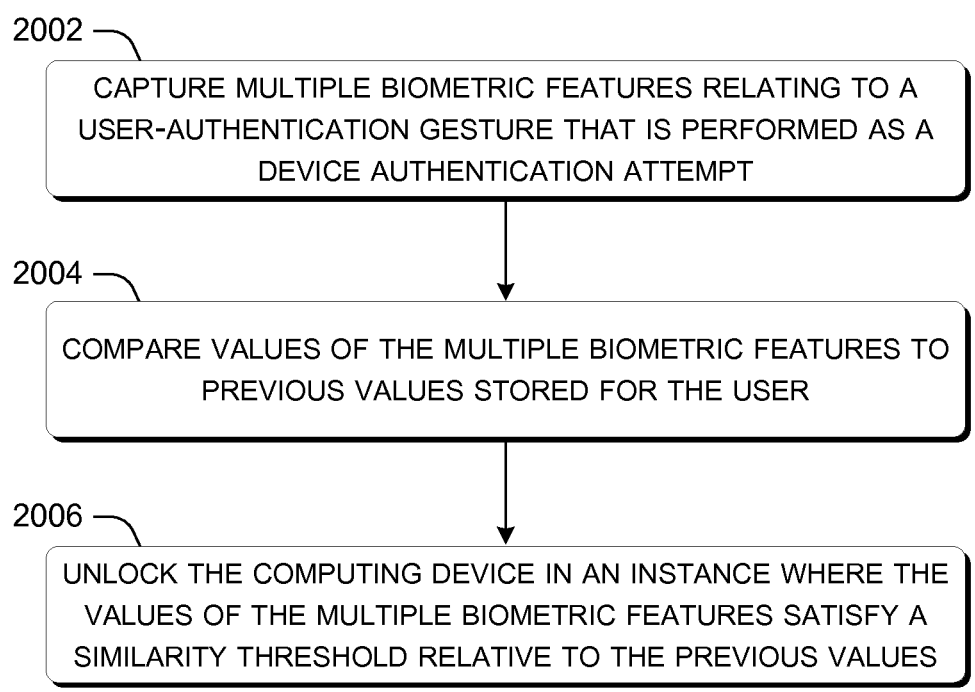

FIG. 20 illustrates a flowchart of an authentication gesture verification technique or method 2000.

At block 2002 the method can capture multiple biometric features relating to a user-authentication gesture that is performed as a device authentication attempt.

At block 2004 the method can compare values of the multiple biometric features to previous values stored for the user.

At block 2006 the method can unlock the computing device in an instance where the values of the multiple biometric features satisfy a similarity threshold relative to the previous values.

The described methods can be performed by the systems and/or devices described above relative to FIGS. 1-18, and/or by other devices and/or systems. The order in which the methods are described is not intended to be construed as a limitation, and any number of the described acts can be combined in any order to implement the method, or an alternate method. Furthermore, the method can be implemented in any suitable hardware, software, firmware, or combination thereof, such that a device can implement the method. In one case, the method is stored on computer-readable storage media as a set of instructions such that execution by a processor of a computing device causes the computing device to perform the method.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:
1. A device comprising:
a hardware processor; and a computer-readable storage medium having computer-executable instructions that, when executed by the hardware processor, cause the hardware processor to:
  detect values of multiple biometric features relating to a user performing an authentication gesture relative to the device, wherein an individual biometric feature reflects a relative positioning of a body part used in performing the authentication gesture with respect to the device;
  retrieve stored values of the multiple biometric features obtained during a training session where the user repeatedly performed the authentication gesture;
  obtain a personalized similarity threshold derived from the stored values, wherein the personalized similarity threshold is based on the relative positioning of the body part when the user repeatedly performed the authentication gesture during the training session;
  compare the detected values to the stored values; and,
  in an instance where a similarity of the detected values to the stored values satisfies the personalized similarity threshold, authenticate the user on the device.

2. The device of claim 1, wherein the personalized similarity threshold is based on the a distance or angle between at least two different body parts when the user repeatedly performed the authentication gesture during the training session.

3. The device of claim 2, wherein the computer-executable instructions, when executed by the hardware processor, cause the hardware processor to:
  identify touch locations on a display of the device where the user repeatedly performed the authentication gesture during the training session by touching the device with the at least two different body parts; and
  determine the stored values based on the touch locations.

4. The device of claim 1, wherein the authentication gesture comprises a touch authentication gesture on the device or a non-touch authentication gesture where the user can perform the non-touch authentication gesture without touching the device.

5. The device of claim 1, wherein the personalized similarity threshold is also based on displacement of the device and rotation of the device when the user repeatedly performed the authentication gesture during the training session.

6. The device of claim 1, wherein the computer-executable instructions, when executed by the hardware processor, cause the hardware processor to:
  analyze variability of the stored values of the multiple biometric features.

7. The device of claim 6, wherein the computer-executable instructions, when executed by the hardware processor, cause the hardware processor to:
  calculate the personalized similarity threshold based on the variability.

8. A method performed by a computing device, the method comprising:
  capturing multiple biometric features relating to a user-authentication gesture that is performed, by a user, as a device authentication attempt, wherein the multiple biometric features include a relative location feature that reflects geometry of a body part of the user;
  comparing current values of the multiple biometric features to previous values of the multiple biometric features stored for the user, the previous values being obtained during a training session when the user performed the user-authentication gesture multiple times; and,
  granting user access to the computing device in an instance where the current values of the multiple biometric features satisfy a similarity threshold relative to the previous values,
  wherein the similarity threshold is personalized to the user based on the previous values of the multiple biometric features, including the relative location feature that reflects the geometry of the body part of the user.

9. The method of claim 8, wherein the multiple biometric features include:
  touch location features on the computing device reflecting the geometry of the body part of the user,
  touch pressure features on the computing device,
  acceleration features of the computing device produced by performance of the user-authentication gesture, and
  displacement features of the computing device produced by performance of the user-authentication gesture.

10. The method of claim 8, further comprising:
  determining absolute location features of touch inputs provided during the user-authentication gesture; and
  based on the absolute location features of the touch inputs, determining relative location features of fingers of the user during the user-authentication gesture,
  wherein the body part is a hand of the user and the geometry of the hand is reflected by the relative location features of the fingers.

11. The method of claim 8, wherein the previous values are obtained during multiple training sessions.

12. The method of claim 8, wherein the previous values are stored on the computing device or stored remotely from the computing device.

13. The method of claim 8, further comprising:
  weighting different biometric features based on how accurately the user reproduces the different biometric features across authentication gesture instances.

14. The method of claim 8, further comprising:
  personalizing the similarity threshold to the user based upon variability of the previous values of the multiple biometric features.

15. The method of claim 14, wherein personalizing the similarity threshold comprises:
  determining previous gyroscope values stored for the user that were obtained from a gyroscope of the computing device when the user performed the user-authentication gesture during the training session;
  determining previous accelerometer values stored for the user that were obtained from an accelerometer of the computing device when the user performed the user-authentication gesture during the training session; and
  determining previous touch location values stored for the user that were obtained from a touch screen of the computing device that the user touched when the user performed the user-authentication gesture during the training session.

16. The method of claim 15, further comprising:
  obtaining the current values of the multiple biometric features by:
    capturing current gyroscope values for the user from the gyroscope of the computing device while the user performs the user-authentication gesture;
    capturing current accelerometer values for the user from the accelerometer of the computing device while the user performs the user-authentication gesture; and
    obtaining current touch location values for the user from the touch screen of the computing device.

17. A device, comprising:
  a display;

at least one sensor coupled to the display;

a user-authentication component configured to cause a graphical user interface to be presented on the display that instructs a user to perform a user-authentication gesture multiple times during a training session, to receive sensor data from the at least one sensor obtained during the training session, and to process the sensor data to obtain training values for at least one biometric feature representing a relative geometry of a body part used to perform the authentication gesture;

the user-authentication component further configured to generate a personalized similarity threshold for the user based on the training values for the at least one biometric feature;

the user-authentication component further configured to receive additional sensor data when the user-authentication gesture is further performed in a subsequent device authentication attempt and to process the additional sensor data to obtain subsequent values for the at least one biometric feature; and, the user-authentication component further configured to authenticate the user on the device if the subsequent values satisfy the personalized similarity threshold.

18. The device of claim 17, wherein the display is a touch sensitive display and wherein the user-authentication gesture comprises a four finger touch gesture on the touch sensitive display.

19. The device of claim 17, wherein the device further comprises a processing unit configured to implement the user-authentication component, wherein the processing unit comprises a general purpose central processing unit or wherein the processing unit is manifest as dedicated circuitry configured to implement the user-authentication component.

20. The device of claim 17, wherein the at least one sensor includes at least two sensors of different types that are configured to provide further sensor data that is utilized by the device for purposes other than the user-authentication.

* * * * *